United States Patent
Polit et al.

(10) Patent No.: US 8,154,753 B2
(45) Date of Patent: Apr. 10, 2012

(54) METHOD AND SYSTEM FOR PROVIDING ACCESS TO IMAGE SYSTEM SERVICES

(75) Inventors: Peter Polit, Indianapolis, IN (US); Robert C. Carroll, Fishers, IN (US)

(73) Assignee: THX, Ltd., San Rafael, CA (US)

(*) Notice: Subject to any disclaimer, the term of this patent is extended or adjusted under 35 U.S.C. 154(b) by 828 days.

(21) Appl. No.: 12/260,385

(22) Filed: Oct. 29, 2008

(65) Prior Publication Data
US 2010/0103270 A1 Apr. 29, 2010

(51) Int. Cl.
*G06F 15/00* (2006.01)
*H04N 1/46* (2006.01)
(52) U.S. Cl. .......................... 358/1.15; 358/504; 358/1.9
(58) Field of Classification Search .................. 358/1.15, 358/1.9, 2.1, 504; 362/293, 310; 348/453; 345/1.2, 593; 382/167
See application file for complete search history.

(56) References Cited

U.S. PATENT DOCUMENTS

| | | | |
|---|---|---|---|
| 6,075,888 A * | 6/2000 | Schwartz | 382/167 |
| 2003/0103234 A1* | 6/2003 | Takabayashi et al. | 358/1.15 |
| 2006/0170792 A1* | 8/2006 | Edgar | 348/234 |
| 2006/0181722 A1* | 8/2006 | Edge | 358/1.9 |
| 2007/0126754 A1* | 6/2007 | Edge | 345/593 |
| 2008/0068630 A1* | 3/2008 | Itagaki | 358/1.9 |
| 2009/0067712 A1* | 3/2009 | Oota | 382/167 |
| 2010/0085480 A1* | 4/2010 | Katakame | 348/453 |
| 2010/0165629 A1* | 7/2010 | Haga et al. | 362/293 |

* cited by examiner

*Primary Examiner* — Jerome Grant, II
(74) *Attorney, Agent, or Firm* — Paul J. Backofen, Esq.; Crockett & Crockett, PC

(57) ABSTRACT

A method and system according to the disclosure facilitates subscription based access to services for image systems including an image acquisition device configured to generate image data describing a target object in a target area of the image acquisition device and an image display device configured to generate a human perceptible rendering of the target object based on the image data.

12 Claims, 1 Drawing Sheet

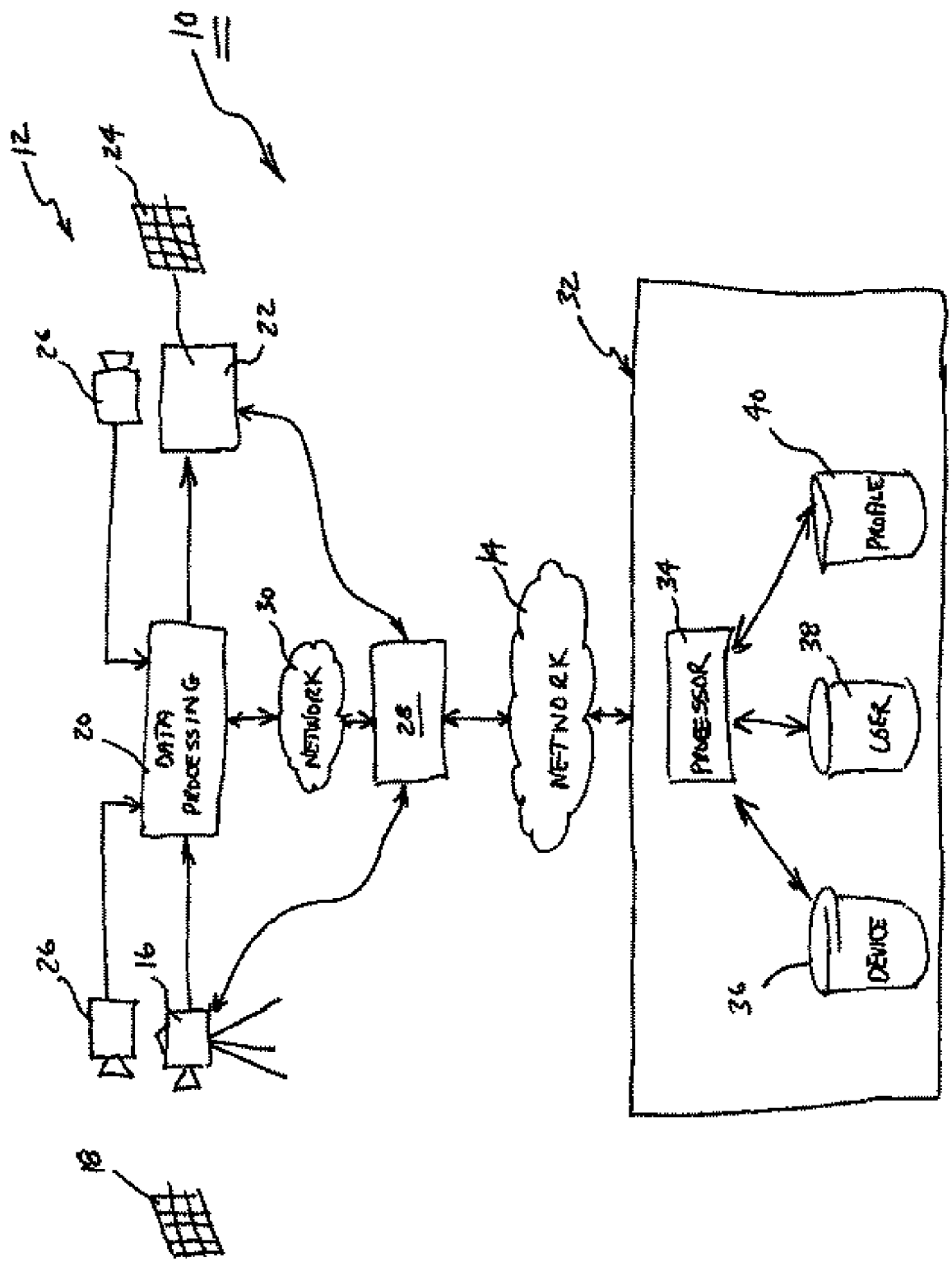

METHOD AND SYSTEM FOR PROVIDING ACCESS TO IMAGE SYSTEM SERVICES

FIELD OF THE DISCLOSURE

The present disclosure relates generally to image system services and more particularly to a method and system for providing access according to a software-as-a-service model to measuring, calibrating, device matching and/or asset management services for image systems having acquisition and display devices and/or providing a collaborative business network to share image system information for compliance and collaborative work flow purposes.

BACKGROUND

Image systems generally include at least one image acquisition device, data storage and at least one image display device. The image acquisition device acquires an image of a target, and creates data representing the image. This data may be manipulated or processed prior to providing the data to the image display device. The image display device converts the processed image data into an output image in some human perceptible form.

Image acquisition devices can be characterized by acquisition profiles which generally represent measurements of exactly how the device generates data representing the target by sensing any of a variety of different information sources such as reflected light, sonar, magnetic resonance, radiation measurements, heat measurements, x-rays, etc. Image display devices, such as video monitors, can similarly be characterized by display profiles which generally represent measurements of exactly how the device converts image data into a human perceptible output. These profiles (acquisition and display) may be determined using conventional systems such as the commercially available cineProfiler™ application of the cineSpace™ suite offered by Cine-tal™ Systems Inc. of Indianapolis, Ind., which measures image devices and generates profiles of image devices.

Over time, the profile of a given device will change for a variety of reasons. Using such systems, samples of the device characteristics are acquired periodically to determine the device profile. In addition to determining profiles, such systems include correction algorithms that permit calibration or adjustment of the image devices to provide an output having known characteristics. For example, an image acquisition device may be calibrated (based on the device's profile) to provide a data output that conforms to a defined standard for color, etc. The image display device (such as a monitor or printer) for the system may also be calibrated (based on the device's profile) to provide an output from the image data conforming to the defined standard which replicates the images captured by the image acquisition device. In addition to calibrating image acquisition and image display devices to known standards, the following other operations may be performed:

(i) matching the output data of one or more image acquisition devices to the output data of another image acquisition device;

(ii) calibrating an image display device (such as a monitor or printer) to an image essence profile, as is further described herein; and (iii) matching the output data of one or more image display devices to the output data of another image display device.

Conventionally, the above-described profile measurements, matching and calibration operations are performed using software and hardware purchased or licensed for use with the particular equipment used in the image system. While this model for image system management is useful, it may not be ideal for certain users. Some users desire access to image management systems only infrequently, and a blanket license to such systems may be overkill for the users' needs. Moreover, installation of the systems at the users' site may be time consuming and expensive. Also, conventional image system management systems do not provide a variety of different asset management services not related to image processing.

SUMMARY OF THE DISCLOSURE

The present system permits access to image system services on a subscription basis. More particularly, the system permits a user to pay a subscription fee for access via a network to a remote image system management service which provides device profiling, matching, calibration, collaborative business networks to share device profiles, and asset management functions.

The features of the system and related methods of this disclosure, and the manner of attaining them, will become more apparent and the disclosure itself will be better understood by reference to the following description of embodiments taken in conjunction with the accompanying drawings.

BRIEF DESCRIPTION OF THE DRAWINGS

FIG. 1 is a conceptual diagram of a system according to one embodiment of the present disclosure.

DETAILED DESCRIPTION OF EMBODIMENTS OF THE DISCLOSURE

The embodiments disclosed below are not intended to be exhaustive or to limit the subject matter to the precise forms disclosed in the following detailed description. Rather, the embodiments are chosen and described so that others skilled in the art may utilize their teachings.

The term "image system" applies to a wide variety of electronic component configurations used in many different industries. In general, image systems include at least one image acquisition device and at least one image display device. Image acquisition devices include, but are not limited to, analog and digital video and still cameras, optical scanners, magnetic resonance imaging (MRI) instruments, positron emission tomography (PET) and computerized tomography (CT) scanning devices, ultrasound echo instruments, thermal imaging instruments, and others. These acquisition devices capture images generated by reflection or emission characteristics of target objects, and generate image data describing the target objects. This data is typically processed and eventually transferred in one form or another to the image display device. Image display devices include, but are not limited to, computer monitors (LCD, CRT, etc.), televisions, video projectors, and printers of various kinds including film printers and film exposure devices. These image display devices receive the processed data, convert it, and render the target object in a human perceptible form.

The detailed descriptions which follow are presented in part in terms of algorithms and symbolic representations of operations on data bits within a computer memory representing alphanumeric characters or other information. These descriptions and representations are the means used by those skilled in the art of data processing to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other physical signals to generate other desired physical signals.

The present system also relates to an apparatus for performing these operations. This apparatus may be specifically constructed for the required purposes or it may comprise a general purpose computer system as selectively activated or reconfigured by a computer program stored in the system. The algorithms discussed herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

In the following description, several terms (in addition to the terms "image system," "image acquisition device," and "image display device") have specialized meanings in the present context. The term "calibration" refers to the adjustment of an image acquisition device to perform in accordance with a predefined performance characteristic (e.g., a standard, a manufacturer's specification, or an acquisition profile of another image acquisition device). The term further refers to the adjustment of an image display device to perform in accordance with a predefined performance characteristic (e.g., a standard specification, an image essence profile generated at an image acquisition device, or a display profile of another image display device). The term "network" refers to a "local area network" or a "wide area network," each including two or more computing devices which are connected (via wires or wirelessly) in such a manner that messages may be transmitted between the devices. The term "computing device" refers to any of a personal computer, work station, server, lap top, personal digital assistant, or any combination of such devices, either as single devices or as a plurality of devices operating in cooperation with one another. In such networks, typically one or more computing devices operate as a "server," a device with large storage devices such as hard disk drives and communication hardware to operate peripheral devices such as printers or modems. Other computing devices provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The term "browser" refers to a program which is not necessarily apparent to the user, but which is responsible for transmitting messages between the computing devices coupled to the network and for displaying and interacting with the network user. Browsers are designed to utilize a communications protocol for transmission of text and graphic information over a world wide network of computers, namely the "World Wide Web" or simply the "Web". Examples of browsers compatible with the present system include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a browser, the present invention may be practiced with text based interfaces, or even with voice or visually activated interfaces, that have many of the functions of a graphic based browser.

Referring now to FIG. 1, a system 10 according to the present disclosure is depicted as connected to an image system 12 via a network 14. Image system 12 is shown including an image acquisition device 16 for capturing a form or image (collectively referred to hereinafter as image 18), data processing equipment 20, an image display device 22 for generating an image 24 corresponding in some manner to the acquired image 18, measurement devices 26, and a computing device 28 coupled to data processing equipment 20 through a network 30 and to system 10 through network 14. It should be understood that in some image systems 12, computing device 28 is incorporated into data processing equipment 20 and network 30 is absent. As indicated above, image acquisition device 16 may include any of a variety of different devices for capturing images. A camera is depicted only as an example. Data processing equipment 20 may include an array of data processing devices including standard computing platforms, special image processing equipment for image alteration, etc. Alternatively, data processing equipment 20 may essentially include a simple connection (wired or wireless) coupling image acquisition device 16 to image display device 22. Again, as mentioned above, image display device 22 may include any of a variety of different devices for generating a display or other output of the acquired image 18. It should be understood from the foregoing that image 24, while shown separately from image display device 22, may simply be displayed on a screen of image display device 22. Alternatively, image 24 may be created on a tangible medium such as paper, film, metal, or a variety of other media for carrying human perceptible indicia. Measurement devices 26 are present at both image acquisition device 16 and image display device 22. Depending upon the configuration of image system 12, measurement devices 26 may include a plurality of different sensing components such as light meters, colorimeters, spectrophotometers or other types of measurement devices. Indeed, it should be understood that any of the components of system 12 depicted in FIG. 1 may include a plurality of devices in operable association with one another to accomplish the task of generating image data from a target object and converting that image data into a human perceptible representation of the target object.

In one embodiment of system 10 of the present disclosure, image system 12 is coupled though computing device 28 and network 14 to a computing device 32. As indicated above, computing device 32 may represent a plurality of computing devices operating in cooperation with one another, each performing one or more functions to provide the services described herein. In one embodiment of the present disclosure, network 14 is the Web. Computing device 32 generally includes a processor 34, a device database 36, a user database 38 and a calibration database 40. Processor 34 depicted in FIG. 1 is a highly simplified representation of a plurality of conventional components which function to permit communications with network 14 and databases 36, 38, and 40 to perform the analysis of data received from image system 12, and to provide calibration adjustments and other services to image system 12. As is further described below, the data contained in each of databases 36, 38, and 40 may have one or more relationships to data contained in the other databases. It should be further understood that databases 36, 38, and 40 are described as separate databases only for the convenience. More or fewer than three databases may be used, and each database may include data other than that described herein.

As further described herein, device database 36 may include performance specifications and capability data for a plurality of different image acquisition devices 16 and image display devices 22. The data for each device may be arranged by manufacturer and/or model number, and represent the manufacturer's specifications for how the particular device is expected to perform. As is also further described below, user database 38 stores data corresponding to the users of system 10. The data corresponding to each user may include user identification, image system configuration information, maintenance information, relationships among users, project information, and asset management information such as performance tolerances, location and use histories, life cycle specifications, maintenance schedules, compliance requirements, etc. Profile database 40 generally includes image standards, image essence profiles, image acquisition profiles, and image display profiles that specify color gamut, contrast ratio, color temperature, spatial resolution, frame rates, and other attributes related to digital image acquisition and display. Profile database 40 may further include related tolerance specifications which essentially function to limit the degree of adjustments the calibration algorithms can cause in particular image acquisition devices 16 and/or image display devices 22 to meet the desired standard or profile. Profile database 40 may also contain relational links to users, devices, and user/projects. For example, a device profile stored in profile database 40 may be associated through a relational link to user data stored in user database 38.

To facilitate access to system 10, the user may be provided with hardware and/or software including an installable application for a standard computing system, devices to measure displays and test charts, and devices for correcting image data in the acquisition and display environments (collectively referred to as "interface equipment") to interface image acquisition device 16 and/or image display device 22 to computing device 28. In the depicted embodiment of system 10, the installable application is executed on computing device 28, the measurement functions are performed by measurement devices 26, the correction or adjustment functions are performed by data processing equipment 20, and the communication functions with computing device 32 are performed by computing device 28.

In operation, the user pays a subscription fee for access to system 10. The subscription fee may permit unlimited access over a fixed time period such as one year. Alternatively, the subscription fee may be on a per-access basis, permitting the user to access the system once to perform one or more operations as described below. Finally, the subscription fee may be based on the duration of access (i.e., by minute, hour, etc.). To initiate use of system 10, the user may connect to system 10 using a browser, select a subscription fee arrangement, and perform an on-line payment transaction in a conventional manner. Of course, alternative procedures such as mail may be used to obtain a subscription. Once the user is subscribed to system 10, a user identification and password may be provided to the user for subsequent access to system 10. At this time, or at a later time when the user desires to perform a profiling and calibration operation as described below, the user may be prompted to provide information identifying image acquisition device 16 and/or image display device 22. Of course, after the user has performed more than one calibration operation and the identification information is stored in user database 38, the user may simply select from previously identified devices.

Alternatively, the interface equipment discussed above may automatically identify image acquisition device 16 and/or image display device 22 and provide the identification information to system 10. Moreover, computing device 28 may be configured to automatically access the system on a periodic basis or otherwise, or to automatically remind the user (e.g., via a notification to access system 10 displayed by computing device 28 or transmitted to the user via network 14, network 30 or otherwise).

After the user has subscribed, logged into the system, and identified (either manually or automatically) the device 16, 22 to be calibrated, the calibration procedure occurs in the following manner. In the case of calibration of image acquisition device 16, image 18 is first placed in the target area of image acquisition device 16. Depending upon the technology employed by image system 12, image 18 may be a color chart, a heating device (for IR sensing), a form (for MRI), etc. As is known in the art, for calibration to occur, image 18 must generate known results when sensed by image acquisition device 16. In other words, image system 12 must know what it is looking at to assess whether the data representation of the target is as expected. In instances when the user is calibrating image acquisition device 16 to a standard, the standard selected for calibration dictates the image 18 to be used as a target. The user may be prompted by system 10 to place, for example, a particular color chart in the target area upon selecting a particular standard for calibration.

The interface equipment then receives data corresponding to image 18 as detected by image acquisition device 16 or measurement device 26. This data is used to create an "acquisition profile" which reflects the characteristics of the target form or image 18. In one embodiment of the present system, the data detected by measurement device 26 is used as the acquisition profile. For example, measurement device 26 may sense spectral data from light reflected by image 18, and provide wavelength and intensity data as the acquisition profile. In this case, the acquisition profile may be characterized as an "essence file" as it represents the characteristics of image 18 without reference to the manner in which image acquisition device 16 detects those characteristics or generates data representing those characteristics. Such an essence file may function as the "standard" to which image display device 22 is required to perform. In this manner, and as is further described below, the display profile of image display device 22 device may be adjusted by a correction algorithm with reference to the essence file to cause image display device 22 to reproduce at image 24 the same characteristics of image 18.

Alternatively, if image acquisition device 16 is used to generate the acquisition profile, the data generated by image acquisition device 16 upon sensing image 18 may include color space data (e.g., RGB, CMYK, YCbCr, etc.). This type of acquisition profile represents how image acquisition device 16 senses image 18 and may function as the "standard" to which another image acquisition device 16 is required to perform. In this manner, the acquisition profile of the other image acquisition device 16 may be adjusted by a correction algorithm with reference to the first acquisition profile to cause the other image acquisition device 16 to generate image data in the same manner as the first image acquisition device 16. This matching of performance characteristics of image acquisition devices 16 may be useful when, for example, a user desired multiple image acquisition devices 16 in image system 12 to provide consistent image data regardless of differences in the devices.

The above-described acquisition profile may alternatively be used, not as a "standard," but as the starting point for causing image acquisition device 16 to perform in conformance with a generally accepted standard (e.g., in a particular industry) associated with image 18. In this case, the acquisition profile is adjusted by a correction algorithm to cause image acquisition device 16 to generate image data from image 18 as expected by the standard. To illustrate this point, assume the acquisition profile includes three values, one each for the colors red, blue and green, as follows:

Acquisition Profile
R=X
B=Y
G=Z

Further assume that the selected standard to which image acquisition device 16 is required to perform expects, when image 18 is used as a target, different values for these colors as follows:

Standard
R=X'
B=Y'
G=Z'

The correction algorithm generated based on this acquisition profile and this standard causes an adjustment in the operation of image acquisition device 16 such that the image data output from device 16 conforms to the standard. The correction may be represented as follows:

Correction Algorithm
X-->X'
Y-->Y'
Z-->Z'

The same concept applies for calibration of one image acquisition device 16 to another. It should be understood that such correction algorithms for calibration may be generated using the commercially available software referred to as cineSpace (particularly the cineCube component) provided by Cine-tal™ Systems Inc.

Regardless of whether the acquisition profile is generated by measurement device 26 or image acquisition device 16, it is communicated to computing device 28, which communicates the profile to computing device 32 via network 14. Processor 34 receives the acquisition profile and stores it in association, for example, with the identified image acquisition device 16 in user database 38, along with information identifying the context in which the profile was obtained (i.e., time, date, location, etc.), which may be automatically determined by computing device 32 or manually entered by the user.

As should be apparent from the foregoing, processor 34 maintains a history of acquisition profiles for each device 16, 22 calibrated by the user. Over time, the performance characteristics of image acquisition devices 16 and image display devices 22 change due to a variety of factors such as component drift, environmental conditions, etc. One feature of the present system is its ability to function as a repository for this performance data for various models of devices. This long-term data may be used to provide users with automated statistical profiles of their device(s) without the need for actually acquiring device profiles. More specifically, it may be predicted based on this long-term data that a certain characteristic of an image acquisition device 16 will change over time by a particular amount. System 10 may provide a correction algorithm which compensates for this change without requiring the user to obtain an acquisition profile for the device 16. Additionally, this data may be sold or otherwise leveraged in relationships with the device manufactures. As the data represents actual performance characteristics of devices over time, device manufacturers may use the data to design time-dependent adjustment mechanisms in the devices to automatically compensate for undesirable deviations from the device's initial performance characteristics.

As indicated above, to perform a calibration operation on device 16, the user must select and/or define a standard or a profile of another similar device to which the user desires device 16 to perform. The user is prompted by system 10 to select a standard from the standards stored in profile database 40 or a device profile generated by the user in the manner described above or made available to them as a subscriber to system 10. Alternatively, the user may select performance characteristics associated with the device being calibrated as provided by the manufacturer of the device. These manufacturer's specifications stored in device database 36 may function as the "standard" to which the device 16 is required to perform. In summary then, an image acquisition device 16 may be calibrated against any of a generally accepted standard, an acquisition profile of another acquisition device 16, or the manufacturer's specifications for acquisition device 16. Hereinafter these various data sets for calibration are referred to as "predefined performance characteristics."

As indicated above, given the deviation of device 16 from the specified predefined performance characteristics to which device 16 is desired to perform, processor 34 generates a correction algorithm for downloading to system 12. The correction algorithm may include but is not limited to 1D Look Up Tables (LUT), 3D LUTs, color space translations, matrix functions, data up-sampling instructions, data down-sampling instructions, data multipliers, data adders and gamma gamma curve corrections. The correction algorithm is used by data processing equipment 20 to adjust the digital output of image acquisition device 16 such that the data corresponds to that needed to match the predefined performance characteristics. As such, image acquisition device 16 is adjusted or calibrated to provide an output that conforms to the selected standard, acquisition profile, or manufacturer's specifications.

As mentioned above, profile database 40 and/or device database 36 may also include tolerance data which processor 34 may access when generating the correction algorithm for a particular calibration operation. The tolerance data may be associated with a particular model of image acquisition device 16 and/or a particular accepted standard or set of manufacturer's specifications to which that device may be corrected to perform. The tolerance data provides adjustment limits for use by processor 34 in generating the correction algorithms. In the event the user desires to use an acquisition profile as the predefined performance characteristics to which the image acquisition device 16 is required to perform, the user may be prompted to provide the tolerance data for various parameters. In any event, for performance parameters to be adjusted by the correction algorithm, processor 34 may verify that the degree of adjustment remains within the associated tolerance data. A message may be generated for the user in the event a particular image acquisition device 16 has measured performance characteristics that deviate to such a large extent that the amount of adjustment required to result in an output that conforms to the predefined performance characteristics would exceed the tolerance limits associated with those characteristics. In such an event, the user may be provided the option of selecting a different standard, or instructed to have the image acquisition device 16 serviced. As an example, if the device must be able to generate a contrast ratio of at least 5,000:1 and the profile shows that the device is not capable of this performance, the system will show that particular device by serial number has failed to meet the minimum standards for use.

After image acquisition device 16 is calibrated or profiled and calibrated, the user may be prompted to perform a profile and/or calibration on another device. For example, the user may select to calibrate image display device 22. The process for calibrating image display device 22 is very similar to that described above with reference to image acquisition device 16. The user may manually identify image display device 22 to system 10 (e.g., by selecting image display device 22 from a list, requesting system 10 to gather identification information (make, model, serial number, service start date, etc.), or entering identification information for the device) or the above-described interface equipment may automatically identify image display device 22. Image display device 22 may be profiled using measurement device 26 such as a calorimeter, light meter, spectral analyzer, or other device used to measure light and color. The user selects predefined performance characteristics for image display device 22 from those available in profile database 40 or device database 38. It should be understood that the predefined performance characteristics may be the same generally accepted standard used for image acquisition device 16, a different standard, the manufacturer's specifications for image display device 22 stored in device database 36, a display profile for another image display device 22 stored in profile database 40, or an essence file stored in profile database 40 which was generated from image 18 in the manner described above. Processor 34 then generates a correction algorithm for image display device 22 that compensates for the deviation of the performance of the device from the predefined performance characteristics. Again, the tolerance data stored in profile database 40 or device database 36 may be used to limit the degree to which any performance parameter of image display device 22 may be adjusted by the correction algorithm generated by processor 34.

In addition to the calibration services described above, system 10 of the present disclosure also provides a variety of different asset management functions to the user. In the process of performing profiling and calibration services, the system acquires a substantial amount of information regarding the long-term performance of the user's devices. Over time and with periodic use, a plurality of device profiles are stored by system 10. Using these profiles, the system can determine trends in the performance of the devices, and predict, for example, when the tolerance data associated with a device will likely be exceeded by a correction algorithm. This information may be provided to the user for budgeting purposes in determining when to repair, service, or replace certain devices.

Additionally, the user may be prompted to identify or select required action items to be associated with particular devices. For example, many devices used in the medical industry are subject to compliance regulations having periodic reporting schedules. The reporting schedules may be stored in user database 38 and used to generate upcoming actions reports for the user to view while accessing the system or reminder messages that are automatically forwarded to the user (e.g., via email, etc.) in advance of the reporting deadline. Other devices are subject to similar reporting requirements to maintain an active status by endorsement entities such as Dolby, THX, etc. In either event, the user may be reminded of the approaching deadline and prompted to perform the required action (e.g., a calibration operation) before the deadline. The system may further be configured to manage the reporting function upon completion of the required actions.

Similarly, many devices are subject to manufacturers' recommended maintenance schedules. These schedules may be provided to the system and stored in user database 38. As a scheduled maintenance event approaches for a device, the user may be notified while accessing the system or via a messaging function as described above.

It should further be understood that system 10 may be configured to provide any of a variety of different reports. Examples include histories of calibration operations by device, life cycle planning reports indicating the projected end of useful life for devices based on the tolerance limitations described above, and reports (retrospective and prospective) on reporting requirements by device, and maintenance reports by device.

The system may also be configured to require the user to identify the location of a device during profiling and/or calibration, and the operator performing the operation. This information, along with the time record associated with the operation, permits the system to provide additional asset management functions. More specifically, the most recent location information may be used by maintenance personnel to locate devices in need of maintenance. Without receiving reports or reminders on maintenance and/or compliance activities, the user can proactively review the profiling and/or calibration histories of devices to schedule such activities.

In another embodiment of the present system, computing device 32 may be configured to communicate with other providers of services (such as asset management services) via network 14. In such an embodiment, information concerning the ability of an image device to meet selected standards and predictable failures based on statistical data about the device gathered over time can be provided as part of a third party interface.

In yet another embodiment of the present system, rather than permitting access to the system on a subscription basis, a version of the system is licensed to the user for self-hosting. In such an embodiment, network 14 may be a local area network which is accessible only by individuals associated with the user. Alternatively, network 14 may be the Web as described above, but access is permitted only to the user and associated individuals, and the user maintains computing device 32. In such a configuration, users are able to access system 10 on internal networks existing behind firewalls instead of using an external network such as the internet.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of calibrating an image system including an image acquisition device and an image display device, the method comprising the steps:
   providing a user access to a remote system on a subscription basis;
   establishing a communication link with the user over a network;
   verifying identification information associated with the user;
   obtaining via the communication link an acquisition profile associated with the image acquisition device;
   generating a prediction of the performance of the image acquisition device over time based in part on the acquisition profile;
   prompting the user to select predefined performance characteristics to which the acquisition profile should be calibrated; and
   providing via the communication link a correction algorithm for adjusting the performance of the image acquisition device to conform to the selected performance characteristics.

2. A method of calibrating an image system including an image acquisition device and an image display device, the method comprising the steps:
   providing a user access to a remote system on a subscription basis;
   establishing a communication link with the user over a network;
   verifying identification information associated with the user;
   obtaining via the communication link an acquisition profile associated with the image acquisition device;
   prompting the user to select predefined performance characteristics to which the acquisition profile should be calibrated;
   prompting the user to place a target object associated with the predefined performance characteristics in a target area of the image acquisition device; and
   providing via the communication link a correction algorithm for adjusting the performance of the image acquisition device to conform to the selected performance characteristics.

3. A method of calibrating an image system including an image acquisition device and an image display device, the method comprising the steps:
   providing a user access to a remote system on a subscription basis;
   establishing a communication link with the user over a network;
   verifying identification information associated with the user;
   obtaining via the communication link an acquisition profile associated with the image acquisition device;
   prompting the user to select predefined performance characteristics to which the acquisition profile should be calibrated, the performance characteristics include tolerance data which limit the adjustment to the performance of the image acquisition device;
   transmitting via the communication link a message to the user, the message including instructions relating to an adjustment that exceeds the limit of the tolerance data; and
   providing via the communication link a correction algorithm for adjusting the performance of the image acquisition device to conform to the selected performance characteristics.

4. The method of claim 3, further including the steps:
   obtaining via the communication link a display profile associated with the image display device; and
   providing via the communication link a second correction algorithm for adjusting the performance of the image display device to conform to the selected performance characteristics.

5. The method of claim 4, wherein the image display device is one of a computer monitor, a television, a video projector, and a printer.

6. The method of claim 4, further including the steps:
   retrieving a reporting schedule associated with the image acquisition device; and
   transmitting via the communication link a message to the user regarding the reporting schedule.

7. The method of claim 4, further including the steps:
   retrieving a maintenance schedule associated with the image acquisition device; and
   transmitting via the communication link a message to the user regarding the maintenance schedule.

8. The method of claim 7, further including the steps:
   obtaining via the communication link location information for the image acquisition device; and
   providing subsequent access to the location information.

9. The method of claim 4, further including the step:
   receiving from the remote system over the network instructions for selecting the target object.

10. A system for calibrating an image system comprising:
    an image acquisition device for generating image data, the image acquisition device having an acquisition profile controlling the generated image data;
    data processing means for correcting and adjusting the generated image data according to the image profile and an profile correction algorithm, the data processing means operatively connecting the image acquisition device to a computing device;
    a first computing device operatively connecting the data processing means to a second computing means over a network;
    a second computing device for processing the acquisition profile, the generated image data and generating acquisition calibration data and providing the generated acquisition calibration data and a profile correction algorithm to the first computing device; and
    generating a prediction of the performance of the image acquisition device over time based in part on the acquisition profile.

11. The system of claim 10 wherein the second computing device verifies that the first computing device is operating under a valid subscription before providing the generated acquisition calibration date and a profile correction algorithm to the first computing device.

12. The system of claim 10 further comprising:
an image display device for displaying image data, the image display device having an display profile controlling the displayed image data; and
wherein the data processing means is for correcting and adjusting the display image data according to the display profile and a profile correction algorithm;
wherein the second computing device is for processing the display profile, the displayed image data and generating display calibration data and providing the generated display calibration data and a profile correction algorithm to the first computing device.

* * * * *